(12) United States Patent
Yamamoto et al.

(10) Patent No.: US 11,962,000 B2
(45) Date of Patent: *Apr. 16, 2024

(54) NON-AQUEOUS ELECTROLYTE SECONDARY BATTERY INCLUDING A POSITIVE ELECTRODE ACTIVE SUBSTANCE CONTAINING A LITHIUM COMPOSITE OXIDE POROUS PARTICLE HAVING VOIDS

(71) Applicants: TOYOTA JIDOSHA KABUSHIKI KAISHA, Toyota (JP); Sumitomo Metal Mining Co., Ltd., Tokyo (JP)

(72) Inventors: Yuji Yamamoto, Toyota (JP); Momoko Procter, Seto (JP); Yoshinari Makimura, Nisshin (JP); Tetsutaro Hayashi, Niihama (JP); Willy Shun Kai Bong, Niihama (JP)

(73) Assignees: TOYOTA JIDOSHA KABUSHIKI KAISHA, Toyota (JP); SUMITOMO METAL MINING CO., LTD., Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 16/925,750

(22) Filed: Jul. 10, 2020

(65) Prior Publication Data

US 2021/0020923 A1 Jan. 21, 2021

(30) Foreign Application Priority Data

Jul. 18, 2019 (JP) .................................. 2019-133133

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/485* (2013.01); *H01M 4/505* (2013.01); *H01M 4/525* (2013.01);
(Continued)

(58) Field of Classification Search
CPC ....... H01M 4/36–628; H01M 10/0525; H01M 2004/021–028; H01M 4/02;
(Continued)

(56) References Cited

U.S. PATENT DOCUMENTS

2012/0258358 A1* 10/2012 Yura .................... H01M 4/02
429/209
2016/0013479 A1 1/2016 Iwasaki
(Continued)

FOREIGN PATENT DOCUMENTS

CN 105932276 A 9/2016
CN 106575745 A 4/2017
(Continued)

OTHER PUBLICATIONS

Aug. 1, 2022 Office Action issused in U.S. Appl. No. 16/925,714.
(Continued)

*Primary Examiner* — Allison Bourke
*Assistant Examiner* — Bethany C Bouchard
(74) *Attorney, Agent, or Firm* — Oliff PLC

(57) ABSTRACT

A non-aqueous electrolyte secondary battery is obtained using a lithium composite oxide having a layered structure in a positive electrode active substance. An increase in resistance following repeated charging and discharging is suppressed. The battery includes a positive electrode provided with a positive electrode active substance layer, a negative electrode and a non-aqueous electrolyte. The positive electrode active substance layer contains a porous particle lithium composite oxide having a layered structure.
(Continued)

The average void ratio of the porous particle is not less than 12% but not more than 50%, and it contains two or more voids having diameters that are at least 8% of its particle diameter. The surface of the porous particle is provided with a coating of lithium tungstate. The coverage ratio of the surface of the porous particle by the lithium tungstate is not less than 10% but not more than 65%.

3 Claims, 3 Drawing Sheets

(51) Int. Cl.
*H01M 4/485* (2010.01)
*H01M 4/505* (2010.01)
*H01M 4/525* (2010.01)
*H01M 10/0525* (2010.01)

(52) U.S. Cl.
CPC .. *H01M 10/0525* (2013.01); *H01M 2004/028* (2013.01)

(58) Field of Classification Search
CPC ............. H01M 10/05; H01M 10/0587; H01M 2220/20; H01M 2220/30; C01G 53/00–64; C01G 45/00–02; C01G 45/1228–125; C01G 51/00–04; C01G 51/42–64; C01P 2004/00; C23C 28/028; Y02E 60/10; Y02P 70/50
See application file for complete search history.

(56) References Cited

U.S. PATENT DOCUMENTS

| | | |
|---|---|---|
| 2016/0254536 A1 | 9/2016 | Hiratsuka |
| 2017/0179483 A1 | 6/2017 | Kuriyama et al. |
| 2018/0013130 A1 | 1/2018 | Ochiai et al. |
| 2019/0020023 A1* | 1/2019 | Yokoyama .............. H01M 4/62 |
| 2019/0036112 A1* | 1/2019 | Aida et al. ............. H01M 4/36 |
| 2019/0221828 A1 | 7/2019 | Hiratsuka |
| 2020/0335780 A1 | 10/2020 | Tochio et al. |

FOREIGN PATENT DOCUMENTS

| | | |
|---|---|---|
| EP | 3 331 069 A1 | 6/2018 |
| JP | 2001-085006 A | 3/2001 |
| JP | 2017-084628 A | 5/2017 |
| JP | 2018-206747 A | 12/2018 |
| KR | 10-2016-0007352 A | 1/2016 |
| WO | 2015/108163 A1 | 7/2015 |
| WO | 2019/131129 A1 | 7/2019 |

OTHER PUBLICATIONS

Sep. 19, 2022 Office Action issued in U.S. Appl. No. 16/926,163.
May 19, 2023 Office Action issued in U.S. Appl. No. 16/926,163.
Jun. 1, 2023 Office Action issued in U.S. Appl. No. 16/925,750.
Jul. 17, 2023 Notice of Allowance issued in U.S. Appl. No. 16/925,714.
Jan. 9, 2023 Office Action issued in U.S. Appl. No. 16/925,714.
Jan. 10, 2023 Office Action issued in U.S. Appl. No. 16/926,163.
Nov. 15, 2023 Notice of Allowance issued in U.S. Patent Application No. 16/926,163.

* cited by examiner

NON-AQUEOUS ELECTROLYTE SECONDARY BATTERY INCLUDING A POSITIVE ELECTRODE ACTIVE SUBSTANCE CONTAINING A LITHIUM COMPOSITE OXIDE POROUS PARTICLE HAVING VOIDS

BACKGROUND OF THE INVENTION

1. Field of the Invention

The present disclosure relates to a non-aqueous electrolyte secondary battery. This application claims the benefit of foreign priority to Japanese Patent Application No. 2019-133133, filed on Jul. 18, 2019, which is herein incorporated by reference in its entirety.

2. Description of the Related Art

In recent years, non-aqueous electrolyte secondary batteries such as lithium ion secondary batteries have been advantageously used as portable power sources for personal computers, handheld devices, and the like, and as motive power sources for vehicles such as electric vehicles (EV), hybrid vehicles (HV) and plug-in hybrid vehicles (PHV).

Positive electrode active substances able to store and release ions that serve as charge carriers are generally used in non-aqueous electrolyte secondary batteries. A lithium composite oxide having a layered structure can be given as an example of a positive electrode active substance (for example, see WO 2015/108163).

Lithium composite oxides having a layered structure are generally in the form of secondary particles formed by aggregation of primary particles. In secondary particles formed simply by aggregation of primary particles, voids are present between primary particles, but these voids are small. Attempts have been carried out in order to improve battery performance by altering the structure of voids in these secondary particles. Specifically, WO 2015/108163, for example, proposes allowing a secondary particle of a lithium composite oxide having a layered structure to be in the form of a hollow particle having one large void. WO 2015/108163 indicates that by using this type of hollow particle, it is possible to reduce direct current resistance and increase discharge capacity.

SUMMARY OF THE INVENTION

However, as a result of diligent research, the inventors of the present disclosure found that a non-aqueous electrolyte secondary battery obtained using a conventional lithium composite oxide having a layered structure encountered the problem of undergoing an increase in resistance following repeated charging and discharging.

Therefore, the purpose of the present disclosure is to provide a non-aqueous electrolyte secondary battery which is obtained using a lithium composite oxide having a layered structure in a positive electrode active substance, and in which an increase in resistance following repeated charging and discharging is suppressed.

The non-aqueous electrolyte secondary battery disclosed here includes a positive electrode, a negative electrode and a non-aqueous electrolyte. The positive electrode is provided with a positive electrode active substance layer. The positive electrode active substance layer contains a lithium composite oxide having a layered structure. The lithium composite oxide includes a porous particle. The average void ratio of the porous particle is not less than 12% but not more than 50%. The porous particle contains two or more voids having diameters that are at least 8% of the particle diameter of the porous particle. The surface of the porous particle is provided with a coating of lithium tungstate. The coverage ratio of the surface of the porous particle by the lithium tungstate is not less than 10% but not more than 65%.

Provided by such features is a non-aqueous electrolyte secondary battery which is obtained using a lithium composite oxide having a layered structure in a positive electrode active substance, and in which an increase in resistance following repeated charging and discharging is suppressed.

In a desired aspect of the non-aqueous electrolyte secondary battery disclosed here, the coverage ratio of the surface of the porous particle by the lithium tungstate is not less than 20% but not more than 42%.

According to such a configuration, the advantageous effect of suppressing an increase in resistance following repeated charging and discharging of the non-aqueous electrolyte secondary battery are particularly enhanced.

In a desired aspect of the non-aqueous electrolyte secondary battery disclosed here, the lithium composite oxide having a layered structure is a lithium nickel cobalt manganese-based composite oxide.

According to such a configuration, resistance characteristics of the non-aqueous electrolyte secondary battery are particularly excellent.

DESCRIPTION OF THE PREFERRED EMBODIMENTS

Figure 1:
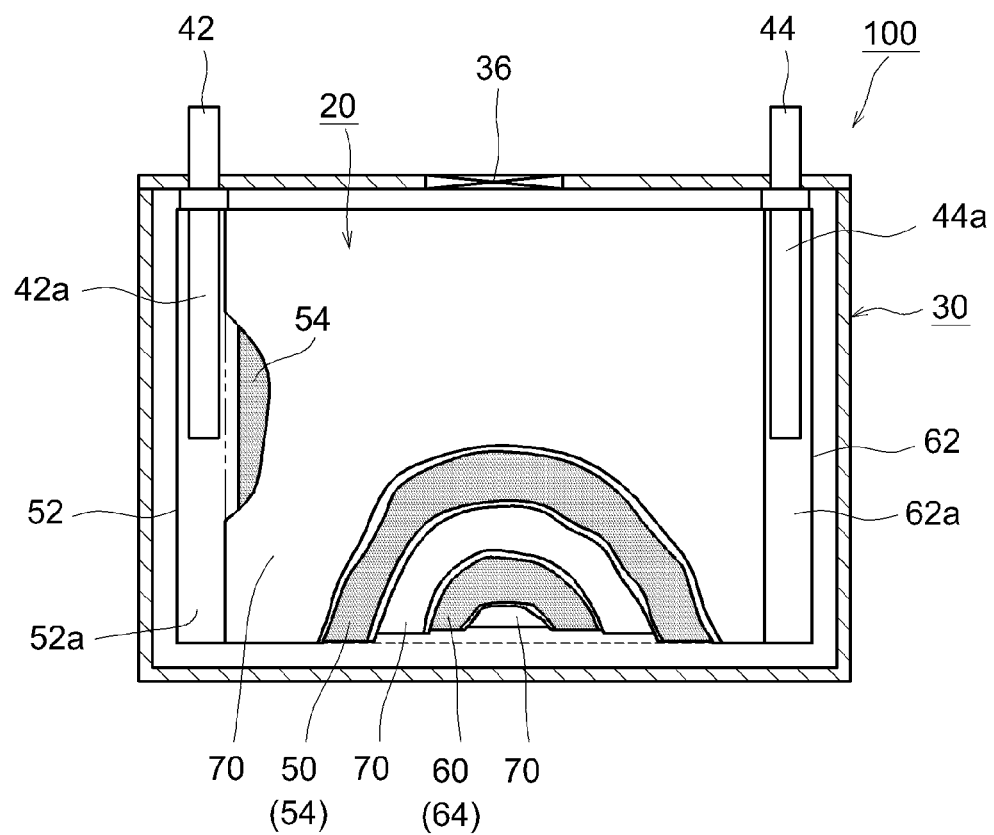
FIG. 1 is a cross-sectional view that schematically illustrates the internal structure of a lithium ion secondary battery according to one embodiment of the present disclosure.

Embodiments according to the present disclosure will now be explained with reference to the drawings. It should be noted that matters which are essential for carrying out the disclosure and which are matters other than those explicitly mentioned in this specification (for example, ordinary features and production processes of the non-aqueous electrolyte secondary battery that do not characterize the present disclosure) are matters that a person skilled in the art could understand to be matters of design on the basis of the prior art in this technical field. The present disclosure can be carried out on the basis of the matters disclosed in the present specification and common general technical knowledge in this technical field. In addition, members/parts that perform the same action are denoted by the same symbols in the drawings below. In addition, the dimensional relationships (length, width, thickness and so on) in the drawings do not reflect actual dimensional relationships.

It should be noted that the term "secondary battery" in the present specification means electricity storage devices in general that can be repeatedly charged and discharged, and is a term that encompasses so-called storage batteries and electricity storage elements such as electrical double layer capacitors.

The present disclosure will now be explained in detail using a flat square lithium ion secondary battery which has a flat wound electrode body and a flat battery case as an example, but the present disclosure is in no way limited to the battery described in this embodiment.

A lithium ion secondary battery 100 shown in FIG. 1 is a sealed lithium ion secondary battery 100 constructed by housing a flat wound electrode body 20 and a non-aqueous electrolyte (not shown) in a flat square battery case (that is to say, an outer container) 30. The battery case 30 is provided with a positive electrode terminal 42 and negative electrode terminal 44 for external connections, and a thin safety valve 36, which is set to release the pressure inside the battery case 30 when this pressure exceeds a predetermined level. In addition, the battery case 30 is provided with an injection port (not shown) for injecting the non-aqueous electrolyte. The positive electrode terminal 42 is electrically connected to a positive electrode current collector plate 42a. The negative electrode terminal 44 is electrically connected to a negative electrode current collector plate 44a. A metallic material which is lightweight and exhibits good thermal conductivity, such as aluminum, can be used as the constituent material of the battery case 30.

Figure 2:
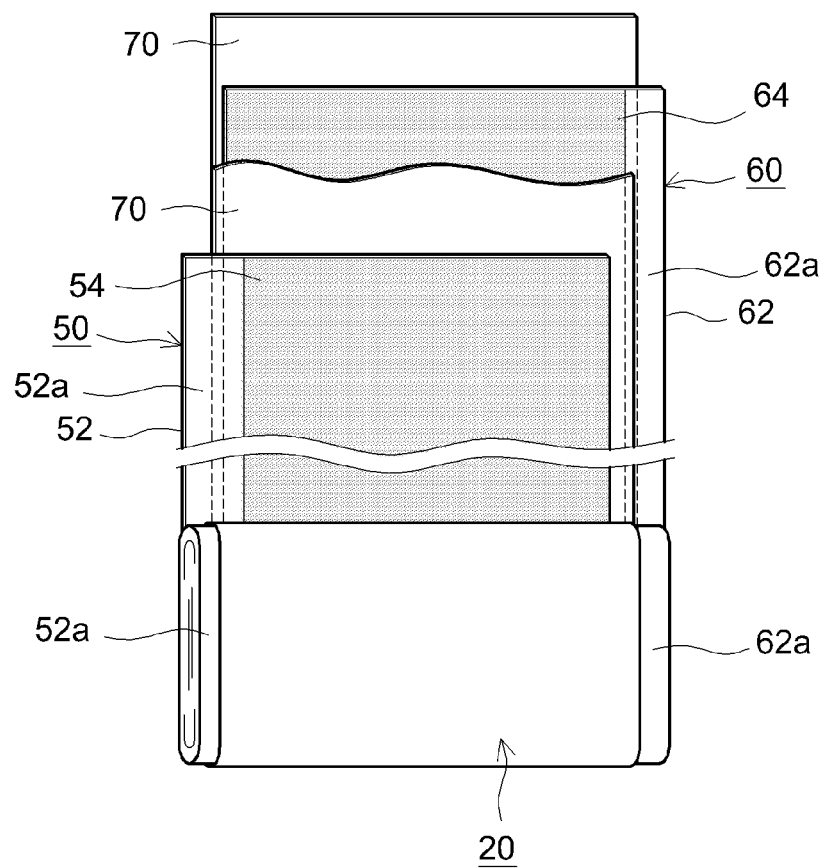
FIG. 2 is a schematic diagram that illustrates a configuration of a wound electrode body of a lithium ion secondary battery according to one embodiment of the present disclosure.

As shown in FIG. 1 and FIG. 2, the wound electrode body 20 is formed into a flat shape by overlaying a positive electrode sheet 50 in which a positive electrode active substance layer 54 is formed in the longitudinal direction on one surface or both surfaces (both surfaces in this case) of a long strip-shaped positive electrode current collector 52, and a negative electrode sheet 60 in which a negative electrode active substance layer 64 is formed in the longitudinal direction on one surface or both surfaces (both surfaces in this case) of a long strip-shaped negative electrode current collector 62, with two long separator sheets 70 interposed therebetween, and then winding this overlaid article in the longitudinal direction. Moreover, a positive electrode active substance layer-non-formed part 52a (that is, a part on which the positive electrode active substance layer 54 is not formed and the positive electrode current collector 52 is exposed) and a negative electrode active substance layer-non-formed part 62a (that is, a part on which the negative electrode active substance layer 64 is not formed and the negative electrode current collector 62 is exposed), which are formed so as to protrude from both edges of the wound electrode body 20 in the winding axis direction (that is, the sheet width direction that is perpendicular to the longitudinal direction), are joined to the positive electrode current collector plate 42a and the negative electrode current collector plate 44a, respectively.

An aluminum foil can be given as an example of the positive electrode current collector 52 that constitutes the positive electrode sheet 50.

The positive electrode active substance layer 54 contains a lithium composite oxide having a layered structure.

Examples of lithium composite oxides having a layered structure include lithium nickel-based composite oxides, lithium manganese-based composite oxides, lithium cobalt-based composite oxides, lithium nickel cobalt aluminum-based composite oxides, lithium iron nickel manganese-based composite oxides and lithium nickel cobalt manganese-based composite oxides. Of these, lithium nickel cobalt manganese-based composite oxides are desired from the perspective of exhibiting particularly excellent resistance characteristics.

It should be noted that in the present specification, "lithium nickel cobalt manganese-based composite oxide" is a term that encompasses not only oxides containing Li, Ni, Co, Mn and O as constituent elements, but also oxides containing one or two or more additional elements in addition to these elements. Examples of such additional elements include transition metal elements and typical metal elements such as Mg, Ca, Al, Ti, V, Cr, Si, Y, Zr, Nb, Mo, Hf, Ta, W, Na, Fe, Zn and Sn. Furthermore, additional elements may be metalloid elements such as B, C, Si and P, and non-metallic elements such as S, F, Cl, Br and I. The content of these additional elements is desirably 0.1 moles or less relative to the amount of lithium. The same also applies to the lithium nickel-based composite oxides, lithium cobalt-based composite oxides, lithium manganese-based composite oxides, lithium nickel cobalt aluminum-based composite oxides and lithium iron nickel manganese-based composite oxides mentioned above.

An oxide having a composition represented by formula (I) below is desired as the lithium-nickel-cobalt-manganese-based composite oxide.

$$Li_{1+z}Ni_{1-x-y}Co_xMn_yM_aO_2 \qquad (I)$$

In formula (I), z, x, y and a satisfy the inequalities $-0.05<z<0.16$, $0<x\leq0.4$, $0<y\leq0.5$, $1-x>y$, and $0\leq a\leq0.1$. M is at least one type of element selected from the group consisting of Mg, Ca, Al, Ti, V, Cr, Si, Y, Zr, Nb, Mo, Hf and Ta. From the perspectives of energy density and thermal stability, it is desirable for x and y to satisfy the inequalities $0.2\leq x\leq0.5$ and $0.2\leq y<0.4$. From the perspective of increasing battery capacity, z desirably satisfies the inequality $0.02\leq z\leq0.10$.

In the present embodiment, the lithium composite oxide having a layered structure is a porous particle. The porous particle has at least two voids.

With regard to the void in the porous particle, the void ratio of the porous particle in the present embodiment is not less than 12% but not more than 50%. The technical significance of this numerical range is explained later.

The void ratio can be determined by using the method described below, for example. A scanning electron microscope (SEM) image of a cross section of the porous particle is obtained using a SEM. Using image analysis software (for example, "WinROOF 6.1.1" available from Mitani Corporation) on this cross section SEM image, outlines are determined for 20 or more arbitrary secondary particles. It should be noted that in cases where a void has an opening at a particle surface, a straight line is drawn between both edges of the opening, and this is taken to be the outline of the particle. Images are binarized so that void parts are black, for example, and parts where primary particles densely exist are white, for example. For each particle, the areas of black parts and white parts are determined per particle, and the value of "total area of black parts/(total area of black parts+total area of white parts)×100" is calculated. An average value is calculated for the 20 or more arbitrary particles mentioned above, and this average value is taken to be the void ratio.

With regard to voids in the porous particle, the porous particle in the present embodiment includes two or more voids having diameters that are at least 8% of the particle diameter of the porous particle. The technical significance of this feature is explained later.

With regard to voids having diameters that are at least 8% of the particle diameter, the upper limit for the void diameter is determined by a relationship with the upper limit of the void ratio, but the void diameter is desirably not more than 22% of the particle diameter.

The diameter of the porous particle can be determined in the following way, for example. A SEM image of a cross section of the porous particle is obtained. In this cross section SEM image, the maximum diameter of the porous particle is first determined, and this is taken to be the length L. The maximum diameter among diameters that are perpendicular to the length L is determined, and this is taken to be the width W. The average value of the length L and the width W (that is, (length L+width W)/2) is determined as the particle diameter. It should be noted that this processing may be carried out using image analysis software (for example, "WinROOF 6.1.1" available from Mitani Corporation).

The diameter of the void can be determined in the following way, for example. In the cross section SEM image, the void is subjected to inscribed elliptic approximation, and the average value of the length LH and width WH of the inscribed ellipse (that is, (length LH+width WH)/2) is determined as the diameter of the void. It should be noted that the inscribed elliptic approximation can be carried out using image analysis software (for example, "WinROOF 6.1.1" available from Mitani Corporation), and in this case, optimal inscribed elliptic approximation is carried out, as appropriate, depending on the image analysis software processing capacity.

Voids having diameters that are at least 8% of the particle diameter may, or may not, be open. When a void is open, a single void may have two or more openings.

The porous particle used in the present embodiment is typically a secondary particle composed of aggregated primary particles. Here, in ordinary porous particles that are secondary particles formed simply by aggregation of primary particles, the number of voids having diameters that are at least 8% of the particle diameter is 0. In addition, in ordinary porous particles that are secondary particles formed by aggregation of primary particles in the form of a shell, the number of voids having diameters that are at least 8% of the particle diameter is 1. Therefore, in the present embodiment, secondary particles in which primary particles are loosely aggregated and which thus have larger voids than normal are typically used.

Figure 3:
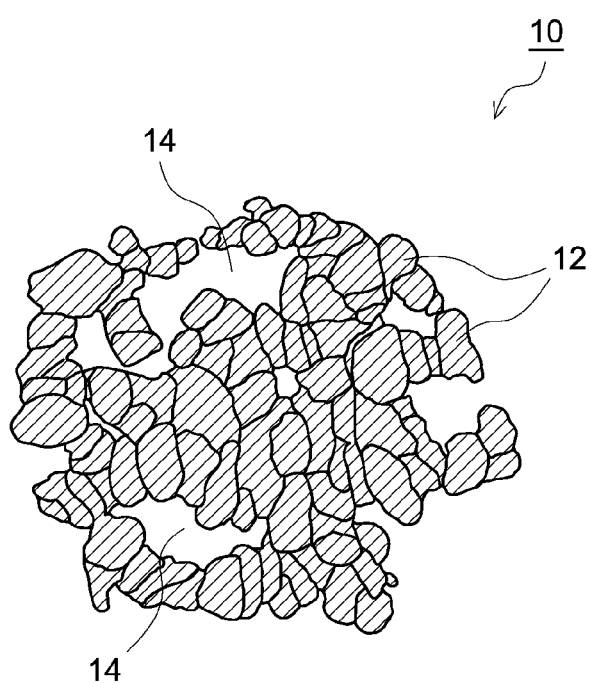
FIG. 3 is a cross-sectional view that schematically illustrates an example of a porous particle used in a lithium ion secondary battery according to one embodiment of the present disclosure.

A specific example of the structure of the porous particle is shown in FIG. 3. FIG. 3 is a schematic cross-sectional view of an example of a porous particle. As shown in FIG. 3, a porous particle 10 is a secondary particle formed by aggregation of primary particles 12. In the secondary particle, the primary particles 12 are more loosely aggregated than normal, and therefore the secondary particle has relatively large voids 14. The diameters of at least two of the voids 14 have lengths that are at least 8% of the secondary particle diameter.

It should be noted that a coating of lithium tungstate, which is described later, is not shown in FIG. 3.

A porous particle having such voids can be produced in accordance with publicly known methods. In particular, in a method including producing a metal hydroxide that serves as a precursor of a lithium composite oxide by means of a crystallization method and then firing this metal hydroxide together with a lithium compound, it is possible to control the porous structure of the porous particle by adjusting conditions in the crystallization method.

In the present embodiment, the surface of the porous particle is provided with a coating of lithium tungstate.

The form of the coating of lithium tungstate is not particularly limited. It is desirable for the lithium tungstate coating to be particulate, and for this particulate coating to be scattered on the surface of the porous particle.

The lithium tungstate that constitutes the coating is a composite oxide containing lithium (Li) and tungsten (W), and the ratio of the number of atoms of lithium (Li) to the number of atoms of tungsten (W) is not particularly limited. The lithium tungstate can have a composition such as $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$ or $Li_{18}W_5O_{15}$.

The lithium tungstate desirably has a composition represented by the formula $Li_pWO_q$ ($0.3 \leq p \leq 6.0$, and $3.0 \leq q \leq 6.0$), and more desirably has a composition represented by the formula $Li_2WO_4$.

In the present embodiment, the coverage ratio of the surface of the porous particle by the lithium tungstate is not less than 10% but not more than 65%. The technical significance of this numerical range is explained later.

The coverage ratio of the surface of the porous particle by the lithium tungstate is desirably not less than 20% but not more than 42%. In such a case, the advantageous effect of suppressing an increase in resistance when the lithium ion secondary battery 100 is repeatedly charged and discharged is particularly enhanced.

The coverage ratio of the porous particle by the lithium tungstate can be determined by quantitatively determining the proportions of elements on the surface of the porous particle by means of, for example, X-ray photoelectron spectroscopy (XPS). Specifically, the proportion of tungsten (W) element and the proportions of metal elements (Me) other than Li among metal elements that constitute the lithium composite oxide on the surface of the porous particle are calculated using the units "Atomic %". The coverage ratio can be calculated on the basis of the following formula using the proportion of W element expressed in terms of "Atomic %" and the proportion of Me elements expressed in terms of "Atomic %".

Coverage ratio (%)={W/(W+Me)}×100

It should be noted that the lithium tungstate coating can be formed in accordance with publicly known methods. For example, the lithium tungstate coating can be formed by mixing porous particles and tungsten oxide or lithium tungstate in the presence of an alcohol solvent having a 1 to 4 carbon atoms, such as ethanol, and then removing the alcohol solvent by means of drying. Even in cases where tungsten oxide is used in the raw materials, lithium on the surface of the porous particles can react with the tungsten oxide and tungsten oxide can be converted into lithium tungstate.

The average particle diameter (average secondary particle diameter) of the positive electrode active substance is not particularly limited, but is, for example, not less than 0.1 μm but not more than 20 μm, desirably not less than 0.5 μm but not more than 15 μm, and more desirably not less than 3 μm but not more than 15 μm. It should be noted that the average particle diameter of the positive electrode active substance can be determined by, for example, obtaining a SEM image of a cross section of the positive electrode active substance and determining the particle diameters of 20 or more particles in the manner described above, and then calculating the average value of these particle diameters.

As explained above, by configuring the lithium composite oxide having a layered structure as a porous particle which has a void ratio of not less than 12% but not more than 50% and which has two or more voids having diameters that are at least 8% of the particle diameter of the porous particle, by coating this porous particle with lithium tungstate at a surface coverage ratio of not less than 10% but not more than 65% and by using this as a positive electrode active substance, it is possible to suppress an increase in resistance in the lithium ion secondary battery 100 following repeated charging and discharging.

It is thought that this is for the following reason.

In general, it is possible to increase the surface area capable of involvement in charging and discharging by appropriately allowing the positive electrode active substance to have voids. However, the positive electrode active substance is secondary particles formed by aggregation of primary particles. Therefore, in cases where charging and discharging is repeatedly carried out, the positive electrode active substance undergoes repeated expansion and contraction, which causes cracks in secondary particles and causes an increase in resistance. In particular, cracks readily occur when the number of voids is high in the positive electrode active substance.

However, by using a porous particle which has the specified void ratio and in which a plurality of voids having the specified size are present, as in the present embodiment, the strength of secondary particles increases and thereby cracking of secondary particles can be suppressed. In addition, by covering the surface of the porous particle with the lithium tungstate at the specified coverage ratio, it is possible to control positions where the positive electrode active substance expands and contracts during charging and discharging to a certain extent, and therefore possible to suppress cracking in secondary particles. Hence, cracking in secondary particles is suppressed, the advantageous effect achieved by the lithium tungstate coating is sustained, and thereby an increase in resistance is advantageously suppressed when the lithium ion secondary battery 100 is repeatedly charged and discharged.

The content of the positive electrode active substance in the positive electrode active substance layer 54 (that is, relative to the total mass of the positive electrode active substance layer 54) is not particularly limited, but is desirably 70 mass % or more, and more desirably 80 mass % or more.

The positive electrode active substance layer 54 may further contain positive electrode active substances other than the lithium composite oxide having a layered structure as long as the advantageous effects of the present disclosure are not impaired.

The positive electrode active substance layer 54 can further contain components other than the positive electrode active substance, for example trilithium phosphate, electrically conductive materials, binders, and the like. Carbon black such as acetylene black (AB) and other carbon materials (for example, graphite or the like) can be advantageously used as an electrically conductive material. For example, poly(vinylidene fluoride) (PVDF) or the like can be used as a binder.

The content of trilithium phosphate in the positive electrode active substance layer 54 is not particularly limited, but is desirably not less than 1 mass % but not more than 15 mass %, and more desirably not less than 2 mass % but not more than 12 mass %.

The content of an electrically conductive material in the positive electrode active substance layer 54 is not particularly limited, but is desirably not less than 1 mass % but not more than 15 mass %, and more desirably not less than 3 mass % but not more than 13 mass %.

The content of a binder in the positive electrode active substance layer 54 is not particularly limited, but is desirably not less than 1 mass % but not more than 15 mass %, and more desirably not less than 1.5 mass % but not more than 10 mass %.

For example, a copper foil or the like can be mentioned as the negative electrode current collector 62 that constitutes the negative electrode sheet 60.

The negative electrode active substance layer 64 contains a negative electrode active substance. For example, a carbon material such as graphite, hard carbon or soft carbon can be used as the negative electrode active substance. The graphite can be natural graphite or artificial graphite, and may be amorphous carbon-coated graphite in a form in which graphite is coated with an amorphous carbon material. The negative electrode active substance layer 64 can contain components other than the active substance, such as a binder or a thickening agent. For example, a styrene-butadiene rubber (SBR), poly(vinylidene fluoride) (PVDF), or the like, can be used as a binder. For example, carboxymethyl cellulose (CMC) or the like can be used as a thickening agent.

The content of the negative electrode active substance in the negative electrode active substance layer is desirably 90 mass % or more, and more desirably not less than 95 mass % but not more than 99 mass %. The content of a binder in the negative electrode active substance layer is desirably not less than 0.1 mass % but not more than 8 mass %, and more desirably not less than 0.5 mass % but not more than 3 mass %. The content of a thickening agent in the negative electrode active substance layer is desirably not less than 0.3 mass % but not more than 3 mass %, and more desirably not less than 0.5 mass % but not more than 2 mass %.

Examples of the separator 70 include porous sheets (films) including resins such as polyethylene (PE), polypropylene (PP), polyesters, cellulose and polyamides. This type of porous sheet may have a single layer structure or a laminated structure having two or more layers (for example, a three layer structure obtained by laminating a PP layer on both surfaces of a PE layer). A heat-resistant layer (HRL) may be provided on a surface of the separator 70.

The non-aqueous electrolyte typically contains a non-aqueous solvent and a supporting electrolyte.

Organic solvents used in electrolyte solutions of ordinary lithium ion secondary batteries, such as a variety of carbonates, ethers, esters, nitriles, sulfones and lactones, can be used without particular limitation as the non-aqueous solvent. Specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC) and trifluorodimethyl carbonate (TFDMC). It is possible to use one such non-aqueous solvent in isolation or an appropriate combination of two or more types thereof.

Lithium salts such as $LiPF_6$, $LiBF_4$ and lithium bis(fluorosulfonyl)imide (LiFSI) (and desirably $LiPF_6$) can be advantageously used as the supporting electrolyte. The concentration of the supporting electrolyte is desirably not less than 0.7 mol/L but not more than 1.3 mol/L.

It should be noted that the non-aqueous electrolyte may contain components other than those described above, for example a variety of additives such as gas generating agents such as biphenyl (BP) and cyclohexylbenzene (CHB); and thickening agents, as long as the advantageous effect of the present disclosure is not significantly impaired.

The lithium ion secondary battery 100 is configured in such a way that an increase in resistance is suppressed when charging and discharging are repeatedly carried out. Therefore, the lithium ion secondary battery 100 exhibits excellent durability.

The lithium ion secondary battery 100 can be used in a variety of applications. Specific examples of applications include portable power sources for personal computers, portable electronic equipment and hand-held devices; motive power sources for vehicles such as electric vehicles (EV), hybrid vehicles (HV) and plug-in hybrid vehicles (PHV); and storage batteries such as small power storage devices, and of these, motive power sources are desired applications. The lithium ion secondary battery 100 can typically also be used in the form of a battery pack in which a plurality of batteries are connected in series and/or in parallel.

As one example, an explanation will be given of a square lithium ion secondary battery 100 provided with a flat wound electrode body 20. However, the non-aqueous electrolyte secondary battery disclosed here can also be constituted as a lithium ion secondary battery having a stacked-type electrode body. In addition, the non-aqueous electrolyte secondary battery disclosed here can be configured as a coin-shaped lithium ion secondary battery, a button-shaped lithium ion secondary battery, a cylindrical lithium ion secondary battery, a laminate-type lithium ion secondary battery, or the like. In addition, the non-aqueous electrolyte secondary battery disclosed here can be configured as a non-aqueous electrolyte secondary battery other than a lithium ion secondary battery in accordance with publicly known methods.

Explanations will now be given of examples relating to the present disclosure, but it is not intended that the present disclosure is limited to these examples.

Examples 1 to 6 and Comparative Examples 1 to 6

Production of Positive Electrode Active Substance

A metal component-containing mixed liquid was prepared by dissolving nickel sulfate, cobalt sulfate and manganese sulfate at a molar ratio of 5:2:3 in water. Meanwhile, a reaction liquid whose pH was adjusted by sulfuric acid and aqueous ammonia was prepared in a reactor. In addition, a pH adjustment liquid was prepared by mixing an aqueous solution of sodium carbonate and an aqueous solution of ammonium carbonate.

The metal component-containing mixed liquid was added under stirring to the reaction liquid at a specified speed while controlling the pH using the pH adjustment liquid. Crystallization was terminated after a specified period of time had passed. Precursor particles, which were hydroxide particles, were obtained by washing the crystallized product with water, filtering and drying. Here, voids formed in the precursor particles were controlled by altering the addition speed of the metal component-containing mixed liquid, the pH, the stirring speed and the reaction time. For example, in the case of Comparative Examples 1 and 2, the void ratio and void diameter were lowered by increasing the reaction time. In addition, in the case of Example 6 and Comparative Example 6, the void ratio and void diameter were increased by lowering the ammonium ion concentration and increasing the precipitation speed.

The obtained precursor particles and lithium carbonate were mixed so that the molar ratio of lithium relative to the total amount of nickel, cobalt and manganese was 1.05. A lithium composite oxide having a layered structure ($Li_{1.05}Ni_{0.5}Co_{0.2}Mn_{0.3}O_2$) was obtained by firing this mixture for 10 hours at 900° C.

The obtained lithium composite oxide and a fine powder of $Li_2WO_4$, which is lithium tungstate, were mixed in the presence of ethanol in a mixer. A lithium composite oxide coated with lithium tungstate, which is a positive electrode active substance, was obtained by removing the ethanol from this mixture by drying. It should be noted that the coverage ratio was controlled by adjusting the added quantity of lithium tungstate, mixing speed and mixing time.

Lithium composite oxides having a lithium tungstate coating were produced as positive electrode active substances in the manner described above. However, in Comparative Examples 1 and 3, the procedure for mixing the lithium composite oxide and lithium tungstate was not carried out, and a lithium composite oxide not having a lithium tungstate coating was obtained as a positive electrode active substance.

Production of Evaluation Lithium Ion Secondary Batteries

A positive electrode active substance layer-forming paste was prepared by mixing the thus produced positive electrode active substance, acetylene black (AB) as an electrically conductive material, poly(vinylidene fluoride) (PVDF) as a binder and N-methylpyrrolidone (NMP) as a dispersion medium using a planetary mixer. Here, the mass ratio of the positive electrode active substance, the AB and the PVDF was 90:8:2, and the solid content concentration was 56 mass %. A positive electrode sheet was produced by coating this paste on both surfaces of an aluminum foil using a die coater, drying and pressing.

In addition, a negative electrode active substance layer-forming paste was prepared by mixing natural graphite (C) as a negative electrode active substance, a styrene-butadiene rubber (SBR) as a binder and carboxymethyl cellulose (CMC) as a thickening agent in ion exchanged water at a C:SBR:CMC mass ratio of 98:1:1. A negative electrode sheet was produced by coating this paste on both surfaces of a copper foil using a die coater, drying and pressing.

In addition, two porous polyolefin sheets having a PP/PE/PP three-layer structure were prepared as separator sheets.

The prepared positive electrode sheet and negative electrode sheet and the two prepared separator sheets were overlaid and wound, thereby preparing a wound electrode body. Electrode terminals were attached to the positive electrode sheet and negative electrode sheet of the produced wound electrode body by welding, and the welded body was housed in a battery case having an injection port.

Next, a non-aqueous electrolyte solution was injected into the battery case from the injection port, and the injection port was then tightly sealed with a sealing lid. It should be noted that a non-aqueous electrolyte solution obtained by dissolving $LiPF_6$ as a supporting electrolyte at a concentration of 1.0 mol/L in a mixed solvent containing ethylene carbonate (EC), dimethyl carbonate (DMC) and ethyl methyl carbonate (EMC) at a volume ratio of 3:4:3 was used as the non-aqueous electrolyte solution.

Evaluation lithium ion secondary batteries were obtained in this way.

Examples 7 to 10 and Comparative Examples 7 to 10

Precursor particles were produced in the same way as described above, except that nickel sulfate, cobalt sulfate and manganese sulfate were used at a molar ratio of 8:1:1. Here, voids formed in the precursor particles were controlled in the same way as described above.

The obtained precursor particles and lithium carbonate were mixed so that the molar ratio of lithium relative to the total amount of nickel, cobalt and manganese was 1.05. A lithium composite oxide having a layered structure ($Li_{1.05}Ni_{0.8}Co_{0.1}Mn_{0.1}O_2$) was obtained by firing this mixture for 10 hours at 800° C.

A lithium composite oxide coated with lithium tungstate was produced in the same way as described above using the obtained lithium composite oxide and a $Li_2WO_4$ fine powder. Here, the coverage ratio was controlled in the same way as described above.

Lithium composite oxides having a lithium tungstate coating were produced as positive electrode active substances in the manner described above. However, in Comparative Examples 7 and 9, the procedure for mixing the lithium composite oxide and the lithium tungstate was not carried out, and a lithium composite oxide not having a lithium tungstate coating was obtained as a positive electrode active substance.

Evaluation lithium ion secondary batteries were produced using a method similar to that described above using these positive electrode active substances.

Examples 11 to 14 and Comparative Examples 11 to 14

Precursor particles were produced in the same way as described above, except that nickel sulfate, cobalt sulfate and manganese sulfate were used at a molar ratio of 4:3:3. Here, voids formed in the precursor particles were controlled in the same way as described above.

The obtained precursor particles and lithium carbonate were mixed so that the molar ratio of lithium relative to the total amount of nickel, cobalt and manganese was 1.05. A lithium composite oxide having a layered structure ($Li_{1.05}Ni_{0.4}Co_{0.3}Mn_{0.3}O_2$) was obtained by firing this mixture for 10 hours at 950° C.

A lithium composite oxide coated with lithium tungstate was produced in the same way as described above using the obtained lithium composite oxide and a $Li_2WO_4$ fine powder. Here, the coverage ratio was controlled in the same way as described above.

Lithium composite oxides having a lithium tungstate coating were produced as positive electrode active substances in the manner described above. However, in Comparative Examples 11 and 13, the procedure for mixing the lithium composite oxide and the lithium tungstate was not carried out, and a lithium composite oxide not having a lithium tungstate coating was obtained as a positive electrode active substance.

Evaluation lithium ion secondary batteries were produced by a method similar to that described above using these positive electrode active substances.

Measurement of Coverage Ratio of Positive Electrode Active Substance

A measurement sample was produced by placing a positive electrode active substance in an aluminum sample pan in a glove box, and pressing the positive electrode active substance with a tablet molding machine. This measurement sample was attached to an XPS analysis holder and subjected to XPS measurements under the conditions shown below using an XPS analysis apparatus (PHI 5000 VersaProbe II, available from ULVAC-PHI, Inc.). Elements to be measured were subjected to compositional analysis, and the proportion of each element was calculated in terms of "Atomic %". Using this value, the coverage ratio (%) was calculated using the formula: {W/(W+Ni+Co+Mn)}×100. The results are shown in the table.

X-ray source: AlKα monochromatic light
Irradiation range: φ100 μm HP (1400×200)
Current and voltage: 100 W, 20 kV
Neutralizing gun: ON
Path energy: 187.85 eV (wide), 46.95 to 117.40 eV (narrow)
Step: 0.4 eV (wide), 0.1 eV (narrow)
Shift correction: C—C, C—H (C1s, 284.8 eV)
Peak data: Handbook of XPS (ULVAC-PHI)

SEM Analysis of Porous Structure of Positive Electrode Active Substance Void Ratio A SEM image of a cross section of the thus produced positive electrode active substance was obtained. Using "WinROOF 6.1.1" image analysis software (available from Mitani Corporation) on this cross section SEM image, outlines were determined for 20 or more arbitrary secondary particles, and images were binarized so that void parts were black and parts where primary particles densely existed were white. The areas of black parts and white parts per particle were determined for each particle. For each particle, the value of "total area of black parts/(total area of black parts+total area of white parts)×100" was calculated, and an average value was calculated for these arbitrarily selected particles, and this average value was taken to be the void ratio. The results are shown in the table.

Void Diameter Relative to Particle Diameter

A SEM image of a cross section of the thus produced positive electrode active substance was obtained. In this cross section SEM image, the maximum diameter of the particle was first determined, and this is taken to be the length L. Next, the maximum diameter among diameters that were perpendicular to the length L was determined, and this was taken to be the width W. This processing was carried out using "WinROOF 6.1.1" image analysis software (available from Mitani Corporation). The average value of the length L and the width W (that is, (length L+width W)/2) was determined as the particle diameter.

Next, voids were subjected to inscribed elliptic approximation. This inscribed elliptic approximation was carried out using "WinROOF 6.1.1" image analysis software (available from Mitani Corporation). In cases where five or more ellipses were listed as inscribed ellipses, five inscribed ellipses were selected in order from the ellipse having the largest area, and in cases where four or fewer ellipses were listed as inscribed ellipses, all of the inscribed ellipses were selected.

For each inscribed ellipse, the average value of the length LH and width WH of the inscribed ellipse (that is, (length LH+width WH)/2) was determined, and this average value was taken to be the inscribed ellipse diameter. For the selected inscribed ellipses, the average value of this inscribed ellipse diameter was determined, and this was taken to be the void diameter.

Using the values above, the value of void diameter/particle diameter×100(%) was calculated for the void having the second largest diameter. The results are shown in the table.

Activation Treatment

Each produced evaluation lithium ion secondary battery was placed in an environment at a temperature of 25° C. Activation (initial charging) was carried out using a constant current-constant voltage method, which included subjecting each evaluation lithium ion secondary battery to constant current charging at a current of ⅓ C to a voltage of 4.2 V, and then constant voltage charging until the current reached 1/50 C, thereby achieving a fully charged state. Next, each evaluation lithium ion secondary battery was subjected to constant current discharging at a current of ⅓ C to a voltage of 3.0 V.

Evaluation of Increase in Battery Resistance Following Long Term Use

Each activated evaluation lithium ion secondary battery was adjusted to an open circuit voltage of 3.70 V. Each battery was then placed in an environment at a temperature of −28° C. Each battery was discharged for 8 seconds at a current of 20 C, and the voltage drop amount ΔV was determined. Next, the battery resistance was calculated by dividing the voltage drop amount ΔV by the discharge current (20 C), and this battery resistance was taken to be the initial resistance.

Next, each activated evaluation lithium ion secondary battery was left in an environment at 60° C., and a cycle including constant current charging at a current of 10 C to a voltage of 4.2 V and then constant current discharging at a current of 10 C to a voltage of 3.3 V was repeated 500 times. The battery resistance after the 500th cycle was measured using the same method as that described above. As an indicator of resistance increase, the resistance increase rate was determined from the formula: (battery resistance after 500th charging and discharging cycle−initial resistance)/initial resistance. For Examples 1 to 6 and Comparative Examples 1 to 6, the resistance increase rate of Comparative Example 1 was taken to be 1, and the resistance increase rates for the other comparative examples and examples were determined as a ratio relative to this. For Examples 7 to 10 and Comparative Examples 7 to 10, the resistance increase rate of Comparative Example 7 was taken to be 1, and the resistance increase rates for the other comparative examples and examples were determined as a ratio relative to this. For Examples 11 to 14 and Comparative Examples 11 to 14, the resistance increase rate of Comparative Example 11 was taken to be 1, and the resistance increase rates for the other comparative examples and examples were determined as a ratio relative to this. The results are shown in the table.

TABLE 1

| | Lithium composite oxide | Void ratio (%) | Diameter of second largest void / particle diameter (%) | Coverage ratio (%) | Resistance increase rate ratio |
|---|---|---|---|---|---|
| Comparative Example 1 | $Li_{1.05}Ni_{0.5}Co_{0.2}Mn_{0.3}O_2$ | 11 | 6 | 0 | 1 |
| Comparative Example 2 | $Li_{1.05}Ni_{0.5}Co_{0.2}Mn_{0.3}O_2$ | 11 | 6 | 25 | 0.98 |
| Comparative Example 3 | $Li_{1.05}Ni_{0.5}Co_{0.2}Mn_{0.3}O_2$ | 28 | 16 | 0 | 1.02 |
| Comparative Example 4 | $Li_{1.05}Ni_{0.5}Co_{0.2}Mn_{0.3}O_2$ | 28 | 16 | 6 | 0.97 |
| Example 1 | $Li_{1.05}Ni_{0.5}Co_{0.2}Mn_{0.3}O_2$ | 12 | 8 | 25 | 0.75 |
| Example 2 | $Li_{1.05}Ni_{0.5}Co_{0.2}Mn_{0.3}O_2$ | 28 | 16 | 10 | 0.83 |
| Example 3 | $Li_{1.05}Ni_{0.5}Co_{0.2}Mn_{0.3}O_2$ | 28 | 16 | 20 | 0.72 |
| Example 4 | $Li_{1.05}Ni_{0.5}Co_{0.2}Mn_{0.3}O_2$ | 28 | 16 | 42 | 0.76 |
| Example 5 | $Li_{1.05}Ni_{0.5}Co_{0.2}Mn_{0.3}O_2$ | 28 | 16 | 65 | 0.87 |
| Example 6 | $Li_{1.05}Ni_{0.5}Co_{0.2}Mn_{0.3}O_2$ | 50 | 22 | 28 | 0.74 |
| Comparative Example 5 | $Li_{1.05}Ni_{0.5}Co_{0.2}Mn_{0.3}O_2$ | 28 | 16 | 70 | 0.96 |
| Comparative Example 6 | $Li_{1.05}Ni_{0.5}Co_{0.2}Mn_{0.3}O_2$ | 52 | 36 | 24 | 0.98 |
| Comparative Example 7 | $Li_{1.05}Ni_{0.8}Co_{0.1}Mn_{0.1}O_2$ | 10 | 5 | 0 | 1 |
| Comparative Example 8 | $Li_{1.05}Ni_{0.8}Co_{0.1}Mn_{0.1}O_2$ | 11 | 6 | 25 | 0.97 |
| Comparative Example 9 | $Li_{1.05}Ni_{0.8}Co_{0.1}Mn_{0.1}O_2$ | 28 | 16 | 0 | 1.03 |
| Example 7 | $Li_{1.05}Ni_{0.8}Co_{0.1}Mn_{0.1}O_2$ | 28 | 16 | 10 | 0.84 |
| Example 8 | $Li_{1.05}Ni_{0.8}Co_{0.1}Mn_{0.1}O_2$ | 28 | 16 | 20 | 0.73 |
| Example 9 | $Li_{1.05}Ni_{0.8}Co_{0.1}Mn_{0.1}O_2$ | 28 | 16 | 42 | 0.77 |
| Example 10 | $Li_{1.05}Ni_{0.8}Co_{0.1}Mn_{0.1}O_2$ | 28 | 16 | 65 | 0.86 |
| Comparative Example 10 | $Li_{1.05}Ni_{0.8}Co_{0.1}Mn_{0.1}O_2$ | 52 | 40 | 28 | 0.98 |
| Comparative Example 11 | $Li_{1.05}Ni_{0.4}Co_{0.3}Mn_{0.3}O_2$ | 10 | 5 | 0 | 1 |
| Comparative Example 12 | $Li_{1.05}Ni_{0.4}Co_{0.3}Mn_{0.3}O_2$ | 11 | 6 | 25 | 0.98 |
| Comparative Example 13 | $Li_{1.05}Ni_{0.4}Co_{0.3}Mn_{0.3}O_2$ | 28 | 16 | 0 | 1.02 |
| Example 11 | $Li_{1.05}Ni_{0.4}Co_{0.3}Mn_{0.3}O_2$ | 28 | 16 | 10 | 0.85 |
| Example 12 | $Li_{1.05}Ni_{0.4}Co_{0.3}Mn_{0.3}O_2$ | 28 | 16 | 20 | 0.74 |
| Example 13 | $Li_{1.05}Ni_{0.4}Co_{0.3}Mn_{0.3}O_2$ | 28 | 16 | 42 | 0.78 |
| Example 14 | $Li_{1.05}Ni_{0.4}Co_{0.3}Mn_{0.3}O_2$ | 28 | 16 | 65 | 0.88 |
| Comparative Example 14 | $Li_{1.05}Ni_{0.4}Co_{0.3}Mn_{0.3}O_2$ | 52 | 40 | 26 | 0.97 |

From the results in Table 1, it can be understood that the resistance increase rate is remarkably low in cases where a lithium composite oxide having a layered structure is in the form of a porous particle, the average void ratio of the porous particle is not less than 12% but not more than 50%, the porous particle has two or more voids having diameters that are at least 8% of the particle diameter, the surface of the porous particle is provided with a coating of lithium tungstate, and the coverage ratio of the surface of the porous particle by the lithium tungstate is not less than 10% but not more than 65%.

Therefore, it can be understood that the non-aqueous electrolyte secondary battery disclosed here can provide a non-aqueous electrolyte secondary battery which is obtained using a lithium composite oxide having a layered structure in a positive electrode active substance, and in which an increase in resistance following repeated charging and discharging is suppressed.

In addition, from the results for Examples 1, 3, 4, 8, 9, 12 and 13, it can be understood that the increase in resistance after the non-aqueous electrolyte secondary battery is repeatedly charged and discharged is particularly low when the coverage ratio of the surface of the porous particle by the lithium tungstate is not less than 20% but not more than 42%. Therefore, it can be understood that the advantageous effect of suppressing an increase in resistance after the non-aqueous electrolyte secondary battery is repeatedly charged and discharged is particularly high in cases where the coverage ratio of the surface of the porous particle by the lithium tungstate is not less than 20% but not more than 42%.

Specific examples of the present disclosure have been explained in detail above, but these are merely examples, and do not limit the scope of the claims. The features set forth in the claims also encompass modes obtained by variously modifying or altering the specific examples shown above.

What is claimed is:

1. A non-aqueous electrolyte secondary battery comprising a positive electrode, a negative electrode and a non-aqueous electrolyte, wherein
the positive electrode is provided with a positive electrode active substance layer,
the positive electrode active substance layer contains a lithium composite oxide having a layered structure,
the lithium composite oxide includes a porous particle,
the average void ratio of the porous particle is not less than 12% but not more than 50%,
the porous particle contains two or more voids having diameters that are each at least 8% of the particle diameter of the porous particle,
the surface of the porous particle is provided with a coating of lithium tungstate, and
the coverage ratio of the surface of the porous particle by the lithium tungstate is not less than 10% but not more than 65%.

2. The non-aqueous electrolyte secondary battery according to claim 1, wherein the coverage ratio of the surface of the porous particle by the lithium tungstate is not less than 20% but not more than 42%.

3. The non-aqueous electrolyte secondary battery according to claim 1, wherein the lithium composite oxide having the layered structure is a lithium nickel cobalt manganese-based composite oxide.

\* \* \* \* \*